COMBINED DRO AND NDRO COINCIDENT CURRENT MEMORY

Filed June 24, 1968 4 Sheets-Sheet 1

INVENTORS
William E. McLean,
Hayden A. Nelson, &
BY David E. Ruch
Thomas N. Young
ATTORNEY INVENTORS
William E. McLean,
Hayden A. Nelson, &
BY David E. Ruch
Thomas A. Young
ATTORNEY

COMBINED DRO AND NDRO COINCIDENT CURRENT MEMORY

Filed June 24, 1968 4 Sheets-Sheet 3

INVENTORS
William E. McLean,
Hayden A. Nelson, &
BY David E. Ruch
Thomas N. Young
ATTORNEY

COMBINED DRO AND NDRO COINCIDENT CURRENT MEMORY

Filed June 24, 1968 4 Sheets-Sheet 4

INVENTORS
William E. McLean,
Hayden A. Nelson, &
BY David E. Ruch
Thomas N. Young
ATTORNEY

United States Patent Office 3,564,517
Patented Feb. 16, 1971

3,564,517
COMBINED DRO AND NDRO COINCIDENT CURRENT MEMORY

William E. McLean, Hales Corners, Wis., and Hayden A. Nelson, Santa Barbara, and David E. Ruch, Goleta, Calif., assignors to General Motors Corporation, Detroit, Mich., a corporation of Delaware

Filed June 24, 1968, Ser. No. 739,251
Int. Cl. G11c *5/02, 11/06, 17/00*
U.S. Cl. 340—174 12 Claims

ABSTRACT OF THE DISCLOSURE

A coincident current magnetic core memory comprising a plurality of core matrices each having a scratch pad or alterable DRO section and a fixed NDRO section sharing conductors of one coordinate axis and the sense windings of each matrix.

BACKGROUND

The invention relates to magnetic information storage devices and more particularly to a coincident current memory composed of a plurality of matrices each having a destructive readout (DRO) section and a fixed program nondestructive readout (NDRO) section.

The invention has for its general object to provide a combined scratch pad DRO and wired-in NDRO memory using the same address selection, sensing and memory cycle timing components.

A specific object is to provide a memory of the above character which attains a fixed NDRO concept by omission of magnetic core storage elements at preselected locations in each of the matrices thereof while permitting the use of sense windings of the same geometrical pattern notwithstanding the different pattern of omitted core positions in each mat.

SUMMARY OF THE INVENTION

A coincident current magnetic core memory comprising a plurality of core matrices each having a scratch pad or alterable DRO section and an NDRO fixed section from which cores have been omitted at certain addressable locations in accordance with a pattern of fixed information of one magnetic orientation permanently stored or wired in the NDRO section. The fixed section has a read cycle of operation that provides a maximum amplitude read out signal in the sensed output enabling the use of unbalanced sense windings which are common to both the fixed and variable sections and are of similar geometrical configuration for each matrix.

DESCRIPTION OF THE PREFERRED EMBODIMENTS

Figure 1:
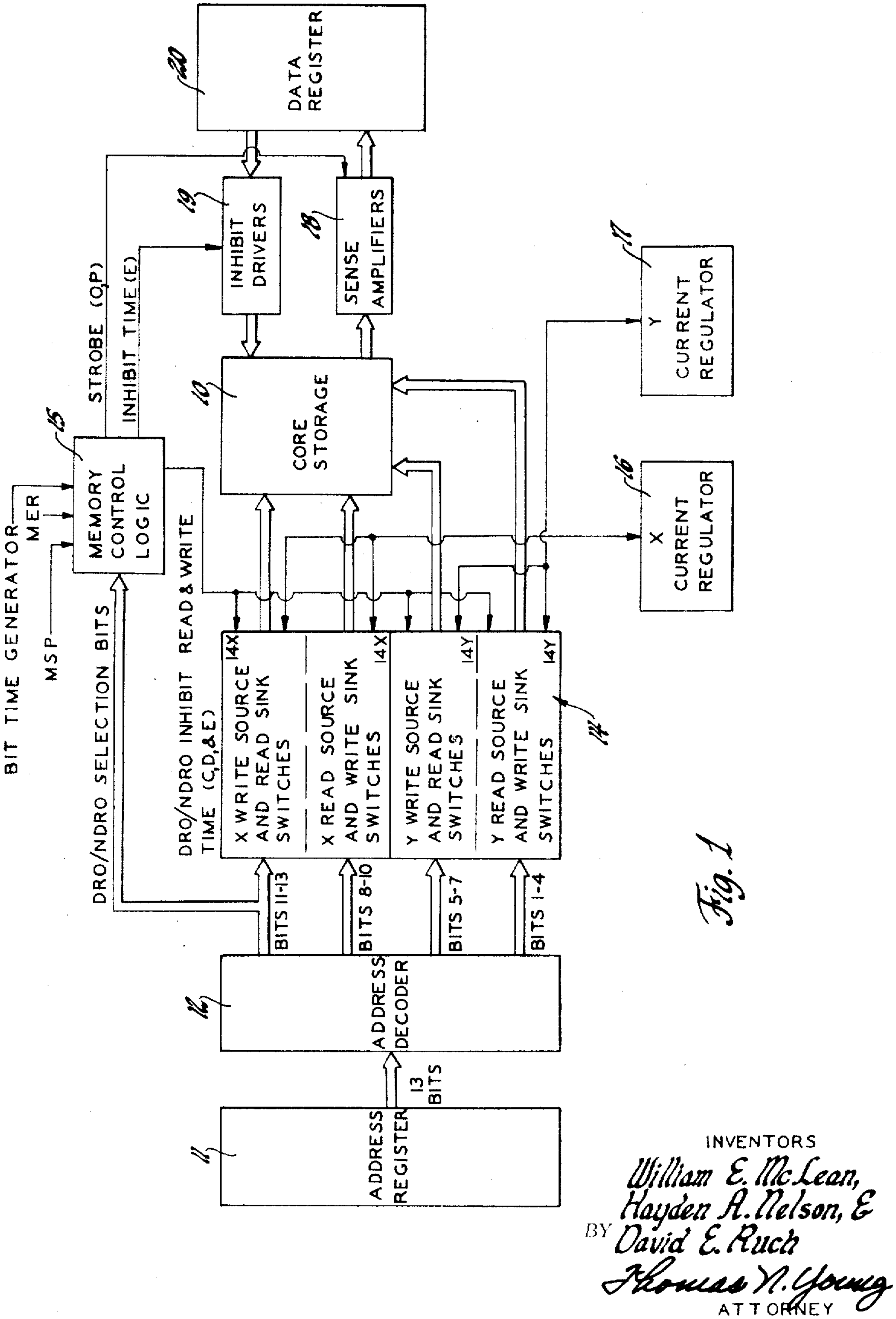
FIG. 1 is a block diagrammatic representation of the general memory organization of a computer in which the subject memory is employed.

FIG. 1 illustrates the general memory organization of a computer in which the subject memory is shown at 10 together with the input, output and timing controls associated therewith. The memory is a coincident current organized core storage memory having a "scratch pad" DRO section and a fixed program NDRO section providing a total storage capacity of 6,144 words in 13 matrices. Each matrix provides 128×48 storage positions allocated between the combined DRO and the NDRO sections thereon and represents a different bit position of each of the memory words.

The memory is accessed from the computer central processing unit (not shown) which supplies a coded address to a 13 bit position flip-flop address register 11. Binary outputs of the address register are supplied through an address decoder 12 coupled to the line selection matrix 14 comprising the X and the Y Axis Accessing Switch Sections 14X and 14Y.

The X axis accessing switch section 14X comprises a set of 14 read switches and a set of 14 write switches for selection of any one of 48 X drive lines, which are arranged in a 6 x 8 matrix of 6 groups of 8 lines. One end of each drive line, which is contained in a group of 8 lines, is connected to the same one of six read and six write switches, referred to as read sink and write source switches herein. The other end of each drive line of a group of eight drive lines is connected through a steering diode to a different read-write switch pair of eight such pairs, referred to as read source and write sink switches here. Thus, any X drive line may be selected by activation of one of the six read sink switches or write source switches and one of the eight read source switches or write sink switches.

The Y axis accessing switch section 14Y comprises two sets of 24 read and write switches for selection of any one of 128 Y drive lines, which are arranged in a 8 x 16 matrix of 8 groups of 16 lines.

The address decoder 12 decodes the memory address instruction to supply enabling logic level address signals to the read and write sink and source switches connected to the X line and the Y line defining or corresponding to the addressed word. Depending upon whether the addressed word is contained in the DRO or NDRO section of the memory, the decoder also enables a DRO or NDRO logic level output to be derived from one or more sets of outputs from the address register.

The addressed Read and Write switches are activated at different times from the memory timing logic control section 15 and connect an X line and a Y line selected thereby in separate driving circuits for receipt of a set drive currents applied thereto in a read direction and another set of drive currents applied thereto in a write direction during the respective timing phrases or portions of the memory cycle.

Figure 2:
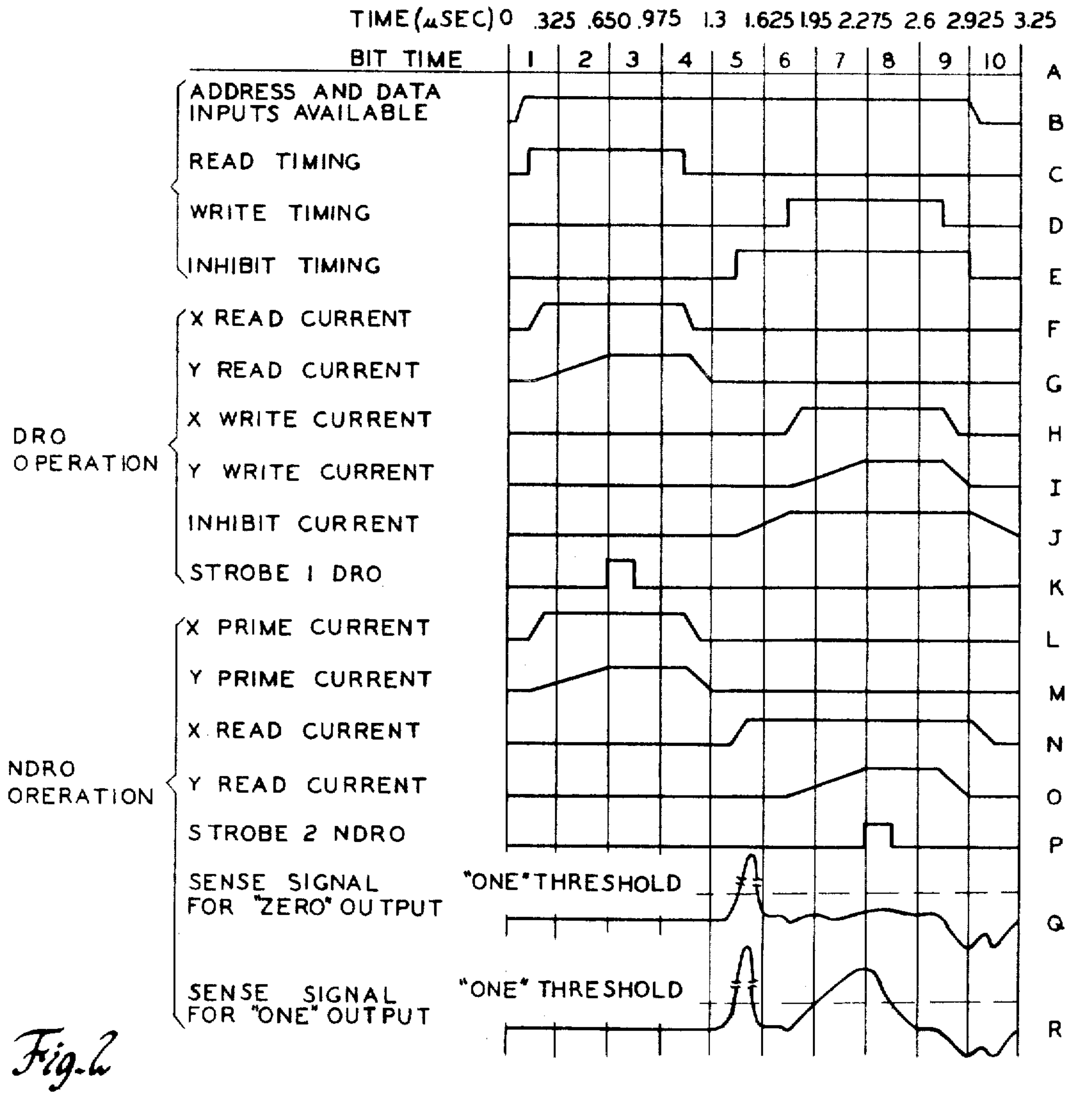
FIG. 2 is a timing diagram illustrating the timing and address logic employed for operation of the memory.

The memory timing control logic section 15 is activated by a memory start pulse MSP received from the CPU and comprises a flip flop binary counter clocked from a memory bit timing generator to provide the read, inhibit and write memory timing inputs to the memory shown at C, D and E in the memory timing diagram of FIG. 2. The timed outputs for reading the DRO and NDRO sections are shown at K and P depicting a pair of time displaced strobe pulses separately generated in the timing control 15.

Figure 3:
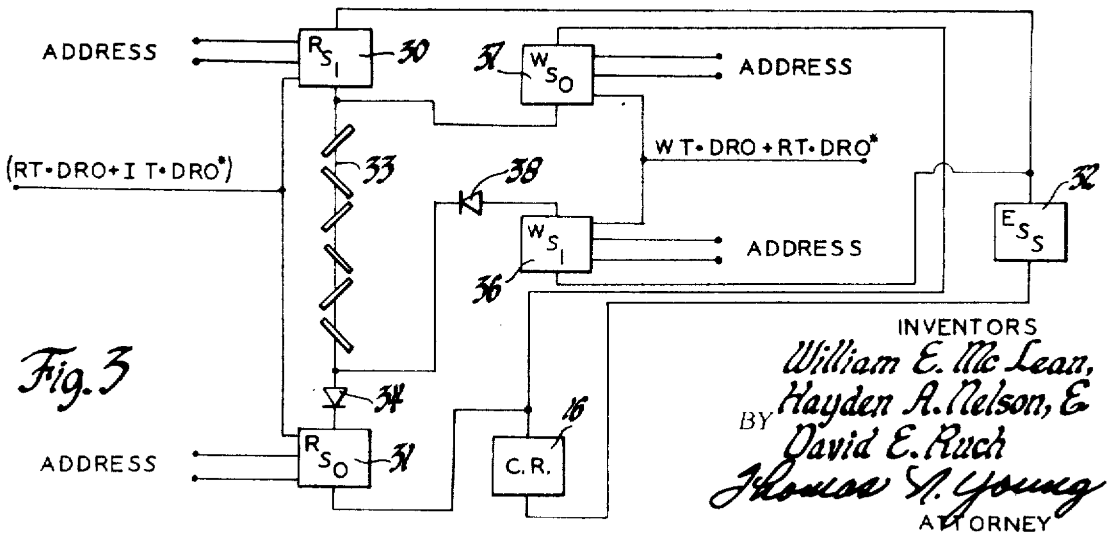
FIG. 3 is a block diagrammatic repersentation of the driving circuit for one axis of drive lines of the memory.

The driving circuit for the X axis of drive lines is shown in FIG. 3 together with the activating timing control signals therefor. The Read Sink switch 30 and Read Source Switch 31 are activated for a read timed DRO Read operation and an inhibit timed NDRO (DRO*) read operation during which current is driven by the stack supply 32 in one direction through Read Sink switch 30, the drive line 33, a steering diode 34, the Read Source switch 31, and a series current regulator identified as 16 in both FIGS. 1 and 3. The Write Sink switch 36 and Write Source switch 37 are activated for a write timed DRO operation and a read timed NDRO operation during which current is driven in the opposite direction through the drive line 33 by the stack supply 32, the Write Sink switch 36, a steering diods 38, Write Source switch 37 and the X axis current regulator 16.

The driving circuit for the Y axis of drive lines is similar except that the Y axis current regulator 17 provides a slower rate of rise of the drive currents in the Y axis drive lines than that provided by the X axis current regulator 16 for the X lines, as indicated in FIGS. 2F and G. Also, the Y read sink and Y read source switches are activated for a write timed, instead of an inhibit timed, NDRO read operation.

The sense amplifiers shown at 18 in FIG. 1 are used during reading operations in conjunction with the sense windings for each core matrix for parallel read out of an information bit from each mat into the memory data register 20. The sense amplifiers are strobed or gated with the strobe timing pulse of FIG. 2–K for a DRO read operation and with the strobe timing pulse of FIG. 2–P for an NDRO read operation.

The inhibit drivers shown at 19 in FIG. 1 are used during write operations in conjunction with the inhibit winding to permit information from the memory data register 20 to be written in parallel into the DRO section of each mat. The inhibit drivers are controlled by the inhibit timing signal (IT) indicated in FIG. 2E and are selectively activated by a data bit from a corresponding section of the memory data register 20.

Figure 4A:
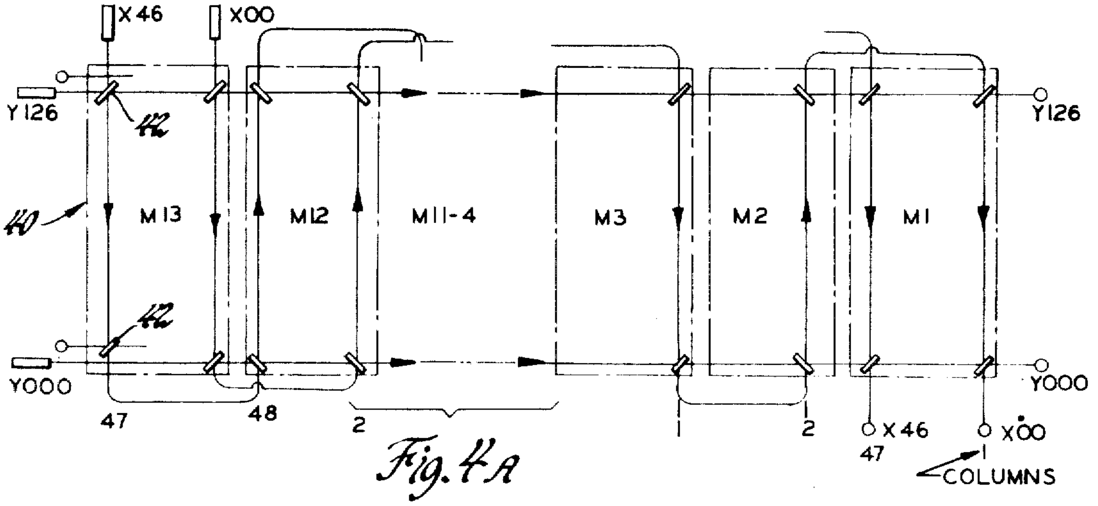
FIGS. 4A and 4B illustrate the stringing patterns of the drive conductors through the several matrices of the memory.
Figure 4B:
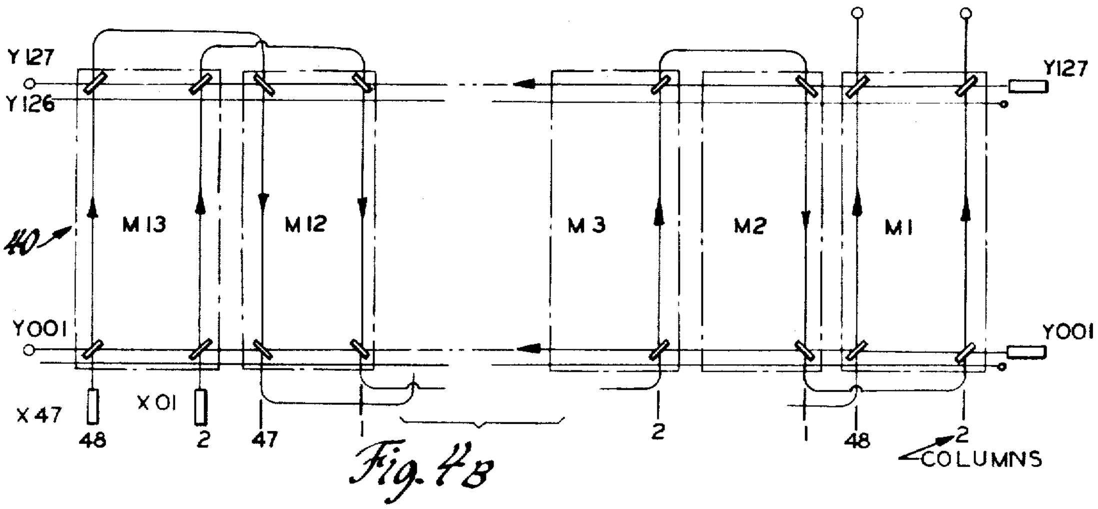

The mats 40, shown in FIGS. 4A and 4B, are comprised of toroidal core magnetic storage elements 42 arrayed in a rectangular configuration on X and Y drive lines. The cores are composed of lithium ferrite and are capable of operating over a wide range of temperatures. Each mat includes a DRO section and an NDRO section in which cores are omitted from certain locations of the NDRO section to attain a fixed memory concept. The DRO and NDRO sections share the conductors of one coordinate axis of drive lines and the same sense windings. The DRO section includes a group of conductors of the other coordinate axis and an inhibit winding. No inhibit winding is provided for the NDRO section of each mat.

Figure 5:
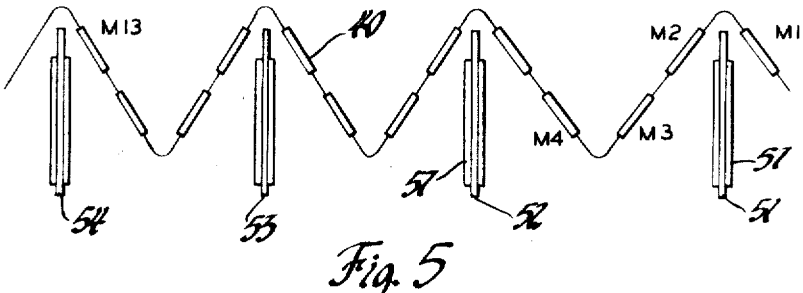
FIG. 5 illustrates the manner of mounting of the several matrices of the memory after stringing.

After the mats have been strung and wired as described below, they are assembled by folding or draping the core matrices on the front and back surfaces of four spaced mounting boards 51–54 as indicated in FIG. 5, to form a compact assembly. Each of the mat mounting boards has a thermal plane 57 thereon for noise suppression and heat dissipation purposes.

The mats are of rectangular configuration and are threaded by 128 Y lines and 48 X lines, which extend continuously through all the mats to eliminate soldering connections between adjacent mats. Each mat is fabricated with the same core orientation pattern, adjacent cores in each mat being alternately "cocked" or oriented in mutually orthogonally related directions.

Each Y line extends straight through all of the mats, while each X line changes direction in its traverse of adjacent mats. The odd rows 1 . . . 127 of Y lines, labelled Y000 . . . Y126, start or enter from the left side of mat 13 and exit from the right side of mat 1, as indicated in FIG. 4A, while the even rows 2 . . . 128 of Y lines, Y001 . . . Y127, start from the right side of mat 1 and exit from the left side of mat 13, as indicated in FIG. 4B. The odd columns 1 . . . 47 of X lines X00 . . . X46 start or enter from the upper side of mat 13 and exit from the lower side of mat 1, as indicated in FIG. 4A, while the even columns 2 . . . 48 of X lines X01 . . . X47 start or enter from the lower side of mat 13 and exit from the upper side of mat 1, as indicated in FIG. 4B.

So that each mat may present the proper electrical characteristics and employ the same core orientation pattern, the odd X conductors as X00 . . . X46, appearing in the first and forty-seventh column of mats 13 and 1, are transposed to extend through the even columns, as columns 2 . . . 46 in their oppositely directed traverse of mats 12 and 2, while the even column conductors, as X01 . . . X47 appearing in columns 2 and 48 of mats 13 and 1, are transposed to extend through the odd columns, as 1 and 47, in their oppositely directed traverse of mats 12 and 2, as indicated in FIG. 4B.

Figure 6:
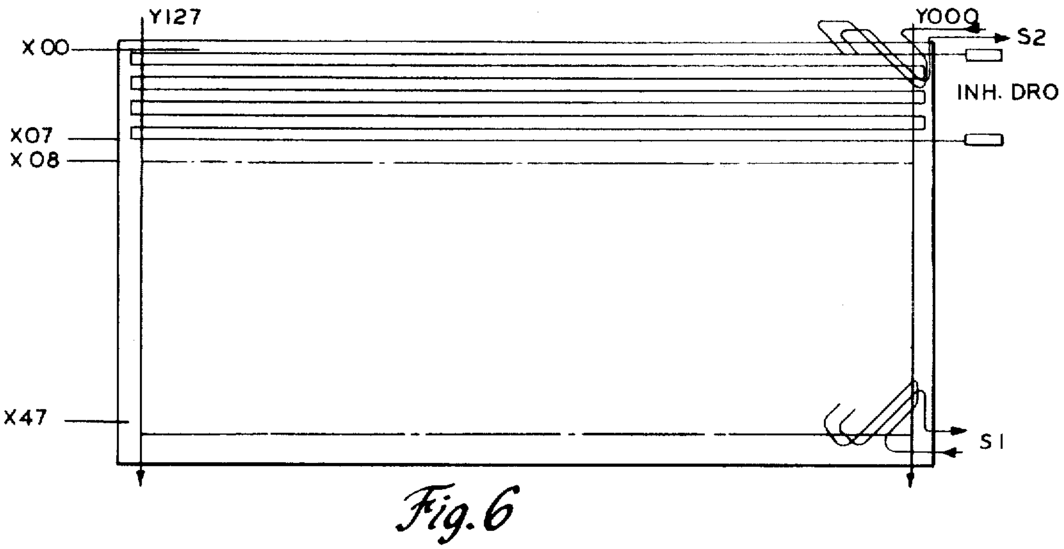
FIG. 6 illustrates the relative portions of a matrix devoted to the DRO and NDRO sections of the memory and the inhibit winding for the DRO section thereof.

The inhibit windings, one of which is provided for only the DRO section of a mat, start and end on the same side of each mat. Each inhibit winding is wound continuously back and forth in such a manner that the direction of the inhibit current through it is opposite to the direction of current flowing in the X drive line conductors during a write cycle. In FIG. 6 where the mat is oriented to show the X and Y conductors extending in the direction of their correspondingly designated axes, the inhibit winding is strung parallel to the X line conductors in the DRO section of each mat.

Two sense windings are provided on each mat. The sense windings extend through both the DRO and the NDRO section of each mat and are wound in complementary patterns along opposite diagonals of the mat, starting and ending on the same side of a mat as indicated in FIGS. 6 and 8.

Of the 6,144 words of storage capacity, 1,024 words are of alterable content and are contained in the variable or DRO section of the memory. The remaining 5,120 words of the memory are of fixed program content and are contained in the permanent or NDRO section, as in FIG. 7. The first 8 of the 48 X address drive line conductors of each mat are used for the variable or DRO section provided in each mat. The remaining 40 X drive line conductors are allocated to the fixed portion of the memory. The Y conductors extend through and are shared by both the DRO and the NDRO sections of each mat.

The memory attains a permanent or fixed memory concept by the omission of cores at those locations whereever ZEROES are to be read out therefrom. Cores are thus provided only at certain locations of the fixed NDRO section in accordance with a pattern of fixed information of one magnetic polarity representing a pattern of stored ONES therein that is effectively wired into the memory. Because the information in each word is different, each mat will have a different pattern of vacated ZERO representing core positions in the NDRO section.

Figures 7, 8, 9:
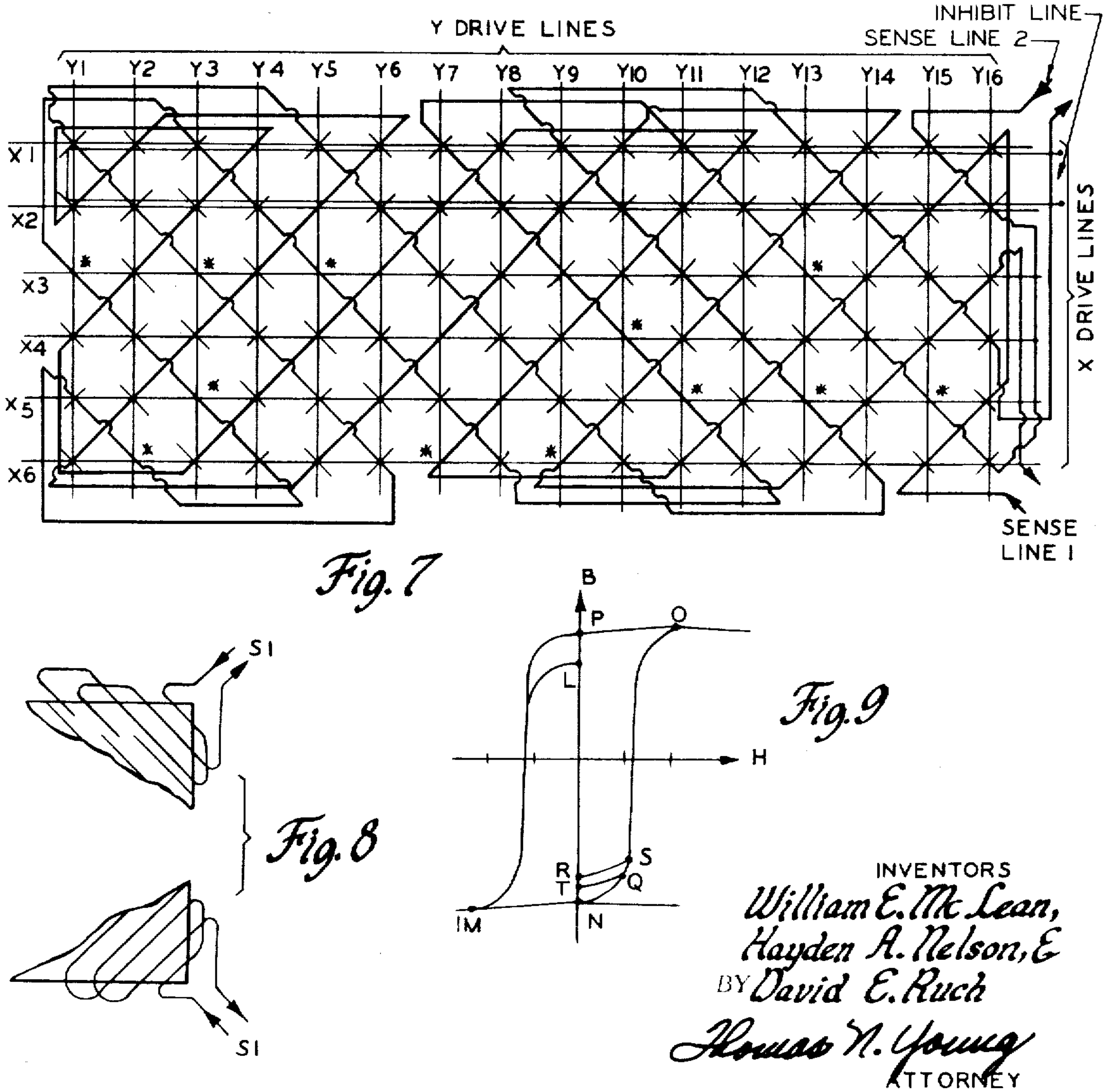
FIG. 7 illustrates a DRO section and an NDRO section provided on one mat of a memory in accordance with concepts of the present invention.
FIG. 8 illustrates the sense winding pattern provided on the respective mats of the memory.
FIG. 9 is a hysteresis loop presented to explain an aspect of the operation of the NDRO section of the memory.

FIG. 7 illustrates a combined DRO and NDRO section of one mat of a memory organization in which the first two rows of X line conductors are contained in the variable DRO section of the mat and link a full complement of cores thereon. The fixed section has cores only at those locations representing a ONE and is characterized by vacated core positions represented by an asterisk (*) at those locations representing a ZERO.

In addition to reducing the number of cores, this manner of attaining a fixed memory concept enables the elimination of an inhibit winding for the fixed section memory with consequent reduction in the inhibit driver power requirements and core stringing time for the variable section of memory. However, the removal of cores from the NDRO section of the memory may cause an unbalance of shuttle noise on the sense line resulting from the remaining cores on a drive line from which unequal numbers of oppositely oriented cores may have been removed. Under worst case conditions all remaining cores on a drive line induce shuttles of like polarity on the sense lines. Therefore, instead of cancelling, the shuttle noises may combine cumulatively to produce a noise voltage in the sense output that exceeds the threshold or ONE/ZERO discrimination level of the sense amplifier and can result in ambiguously interpreting a ZERO as a ONE.

In the described embodiment having the relatively slow Y current rise, it may be assumed that the characteristics of the cores and of the sense amplifiers are such that up to 12 uncancelled shuttles can be tolerated for an acceptable signal-to-shuttle noise ratio in the amplifiers. The worst case uncancelled shuttles in an X and in a Y drive line, however, is that caused by the omission of 64 cores on an X line and 20 cores from a Y line, which are in excess of the stated tolerable number of uncancelled shuttles necessary to distinguish a ONE from a ZERO by the sense amplifiers.

The present memory is thus designed so that the larger delta or minor hysteresis loop shuttle effects are concentrated in the X lines by providing a greater number of core positions on an X line than on a Y line, and the memory is operated by driving the X lines with a faster rise time than the Y lines through the different rise time control sections of the X and Y axis current regulators. In addition, the X lines of the NDRO section of the memory are driven at an earlier time than the Y lines by using an inhibit timed control signal for the X axis drive currents and a write timed control signal for the Y axis drive currents to stagger the time of application of the X and Y drive currents to the X and the Y lines for an NDRO read operation, as shown in FIGS. 2–N and 2–O. In this manner the greater delta noise effect resulting from the larger number of uncancelled shuttles of an X line of the NDRO section will decay before the current in the later driven Y line has attained its level to combine with the field produced by the X line current to switch a selected core in the NDRO section. FIG. 2 illustrates how the slow rise time of the Y read current waveform O prevents a ZERO output from being erroneously interpreted as a ONE because of the delta noise of the Y axis. As waveform Q shows, the delta noise generated by the X read current, waveform N, occurs and decays prior to the rise of the Y read current. If the Y read current had the same slope as the X read current, the delta noise produced by it would be superimposed on the sense signal output and the sum of these voltages would exceed the ONE threshold. Application of the NDRO strobe would therefore cause a ONE level sense signal to be read rather than a ZERO level. However, a relatively slowly rising Y read current reduces the magnitude of the delta noise of the Y axis thereby allowing a ZERO level to be correctly read.

The delta noise effects, i.e., the sum of the shuttle noises, in the Y lines are handled by splitting the sense winding for each mat into a number of windings such that the maximum number of uncancelled shuttles contributed by an X or Y line conductor to any one of the sense windings traversing that conductor will be within the tolerable number of uncancelled shuttles and the threshold or discrimination level of the sense amplifiers. Quantitatively stated, the number of sense windings for each mat is related to the number of NDRO X lines (or possible core or bit positions on a Y line) divided by twice the tolerable number of uncancelled shuttles.

In the present case, two such sense windings are used, each traversing the entire area of a mat, but serving half the number of core or bit positions of each X and Y line conductor of the mat. The total number of uncancelled shuttles in each sense line will thus be within the tolerable number of uncancelled shuttle noise figure and the discrimination level of the sense amplifier provided for each sense winding.

The sense amplifiers are of conventional construction, the outputs of the amplifiers serving a mat being basically OR'ed and supplied to the input of the corresponding section of the memory data register. It will be noted that each sense winding is of similar geometrical configuration, notwithstanding the different pattern of vacated core positions on each mat.

In addition to the foregoing expedients, the NDRO section of the memory uses a prime-read mode of operation that produces a high signal output level from a switched core therein. Instead of reading a core during the initial portion of the memory cycle as is done in the DRO section, a core contained at an addressed NDRO location is restored or primed from its resident level of remanence of one magnetic polarity condition to its undisturbed remanent state of its opposite magnetic polarity condition. The core is then read out when it is subsequently switched back to its original magnetic polarity condition, producing a full output therefrom.

This action is depicted in FIG. 9 in which the points P and N represent the remanent conditions of an undisturbed core driven along the illustrated major hysteresis loop. The application of half select currents to the drive lines causes the cores, subjected to the influence of only one of the lines, to travel along minor hysteresis loops as NQT, which also illustrates the nature of the shuttle noise effect of an unselected or partially disturbed core on the drive line. Depending upon the previous history of application of plus and minus or read and write half select currents to the drive line on which the core is contained the core may be at either of two remanent levels as R or L disturbed or removed from the points N or P. If such a disturbed core were read when it was driven along the path RSO or LMN, the flux change produced thereby induces less than a full output voltage therefrom in the sense winding. However, by driving the core from say point L to its undisturbed opposite remanent magnetic polarity condition at point N, and then reading the core when it is subsequently driven along the path NOP, a higher output representing a full ONE readout is obtained therefrom.

In addition to increasing or improving the ONE to ZERO discrimination level or signal to noise ratio in the sensed output, the priming of the NDRO section sets or restores the interrogated cores to their ONE representing condition each time the NDRO section is to be read, thereby preventing possible loss of information between memory cycles or shut down and turn on of the memory.

It will be apparent from FIG. 2 that the DRO and the NDRO sections of the memory are selectively and inversely exercised with respect to read and write operations during the respective portions of the memory access cycle.

In the case of an addressed word in the DRO memory section, the addressed pair of line selecting read switches of each of the X and Y axis accessing switch sections 14X and 14Y are actuated upon the receipt of an enabling read timing DRO signal (RT·DRO) which is derived by gating the read timing term of the memory timing control section 15 with the DRO term derived from the decoded address instruction from the computer Central Processing unit. Activation of the read switches permits a half select drive current to flow through the selected X line and Y line in one direction. The sense amplifiers are strobed with the strobe 1 DRO signal shown in FIG. 2–K to execute a DRO read operation during the read phase or initial portion of the variable memory cycle.

The addressed pair of line selection write switches of the X and Y accessing switch sections 14X and 14Y are activated upon the subsequent receipt of an enabling write timing DRO signal (WT·DRO) to permit current to flow through the same selected lines in the opposite direction during the subsequent write phase portion of the memory cycle. However, prior to the activation of the write switches, the inhibit drivers 19 for those mats requiring a ZERO input for a specified bit position of the data register are activated by the inhibit timing signal (IT) which occurs prior to the write timing signal as shown in FIGS. 2–D and E. The activated inhibit drivers cause current to flow in their respective inhibit windings to prevent the subsequently applied write curents from switching the addressed cores of the specified mats to a ONE representing condition.

Where the addressed word is contained in the NDRO section of the memory, the write switches are activated before the read switches. An addressed pair of write switches of each of the accessing switch sections 14X and 14Y is actuated upon receipt of an enabling read timing NDRO (DRO*) signal (RT·DRO*) to permit half select currents to flow through the selected X line and Y line in a write direction during the initial phase portion of the fixed memory cycle to prime or restore a ONE representing core present at the addressed location of the NDRO section of each matrix. The read switches of the X and Y axis accessing switch sections are then activated in sequence to permit half select currents to flow through the selected X and Y lines in a read direction upon the application of an enabling inhibit timed NDRO signal (IT·DRO*)

to activate the addressed pair of read switches of the X axis accessing switch section 14X and upon the subsequent application of a write timed NDRO signal (WT·DRO*) to subsequently activate the addressed pair of read switches of the Y axis accessing switch section 14Y. The strobe 2 DRO signal of FIG. 2–P is then applied to the 26 sense amplifiers during the latter portion or phase of the memory cycle to output the information from the sense windings in parallel to the memory output data register.

It is to be understood that the foregoing description relates to a specific embodiment of the invention and is not to be construed in a limiting sense. For a definition of the invention, reference should be had to the appended claims.

We claim:

1. A coincident current memory matrix providing a store of information at a plurality of addressable locations and comprising an alterable or DRO section having a switchable biremanent magnetic storage element at each addressable location thereof and a fixed NDRO section having a switchable biremanent storage element only at certain addressable locations thereof in accordance with a pattern of fixed information of one magnetic character permanently stored in the fixed section of the memory, inhibit means for the DRO section of the memory for restoration and changing of information therein, and sense line means common to both the DRO section and to the NDRO section of the memory for reading information therefrom.

2. A coincident current memory in accordance with claim 1 wherein the magnetic storage elements are coupled to drive conductors directed along different ones of each of a pair of coordinate axes and wherein the DRO section and the NDRO section of the memory share the drive conductors of one of the coordinate axes.

3. A coincident current memory in accordance with claim 2 wherein the toroidal storage elements are magnetic cores and wherein the NDRO section of the memory is characterized by the presence of cores only at certain locations thereof and by the absence of cores at the remaining locations thereof.

4. A coincident current memory in accordance with claim 3 wherein the memory is comprised of a plurality of different bit representing matrices each having a DRO section and an NDRO section of which the NDRO section has a different pattern of absent core positions in each of the memory matrices and wherein the sense line means includes separate sense windings of the same geometrical configuration for each matrix of the memory, notwithstanding the different pattern of absent core positions of each of the matrices.

5. A coincident current memory in accordance with claim 4 wherein the sense winding means for each matrix includes a plurality of sense windings each traversing the entire area of its matrix but serving only a proportionate number of bit positions therein in accordance with the number of sense windings provided for each mat.

6. A coincident current memory in accordance with claim 5 comprising two sense windings of the specified character for each mat.

7. A coincident current memory in accordance with claim 6 further including means for energizing the drive conductors, memory cycle timing means having a first timed portion and a second timed portion and, means selectively and inversely operating the DRO section and the NDRO section of the memory during respective timing portions of the memory cycle.

8. A coincident current memory in accordance with claim 7 wherein the NDRO section of the memory has a prime-read cycle of operation in which a magnetic storage element present at an addressed location in the NDRO section is primed to an undisturbed remanent condition during the first portion of the memory cycle and is read out during the second portion of the memory cycle.

9. A coincident current memory in accordance with claim 8 wherein the memory cycle timing means has a read timed portion, an inhibit timed portion following the expiration of the read timed portion and a write timed portion initiated subsequent to the initiation of the inhibit timed portion and wherein the drive conductors directed along the said one of the coordinate axes are allocated between the DRO section and the NDRO section of the memory and wherein the drive conductors directed along the said one of said coordinate axes and allocated to the NDRO section of the memory are energized at the inhibit timed portion of the memory cycle while the conductors directed along the said other of said coordinate axes are energized at the subsequently initiated write timed portion of the memory cycle during a read operation of the NDRO section of the memory.

10. A coincident current memory in accordance with claim 9 including a sense amplifier for each of the sense windings of a mat and wherein the memory cycle timing means provides a first strobe signal to the sense amplifiers of each mat during the first portion of the memory cycle for a DRO read operation and provides a second strobe signal to the sense amplifiers of each mat during the second portion of the memory cycle for an NDRO read operation.

11. A coincident current memory matrix providing a store of information in a plurality of positions therein and comprising a plurality of row conductors, a plurality of column conductors, a plurality of switchable biremanent magnetic information storage elements coupled only to certain row conductors and column conductors to represent a pattern of magnetic information of one magnetic polarity stored in the memory, said elements residing at different disturbed levels of magnetic remanence of said one magnetic polarity in accordance with their previous history of magnetization, means for energizing a row and column conductor in one direction to select and prime a magnetic element coupled to both said conductors and drive it from its resident remanent level of said one magnetic polarity to an undisturbed remanent level at its opposite magnetic polarity condition, means for subsequently energizing the same row conductor and column conductor in the opposite direction to drive said selected element from its undisturbed remanent level at its opposite magnetic polarity condition to an undisturbed remanent level of its original polarity condition, and means for sensing the output from such magnetic element when it is subsequently driven back to its original magnetic polarity condition.

12. A coincident current memory in accordance with claim 11 comprised of a plurality of matrices of the described character and wherein said sensing means includes two separate sense windings of the same geometrical configuration for each matrix, each of the sense windings of a matrix traversing the entire area of its matrix but serving only half the number of information positions therein.

References Cited

UNITED STATES PATENTS

| | | | |
|---|---|---|---|
| 3,142,049 | 7/1964 | Crawford | 340—174 |
| 3,215,992 | 11/1965 | Schallerer | 340—174 |
| 3,478,333 | 11/1969 | Faulkner | 340—174 |

JAMES W. MOFFITT, Primary Examiner

U.S. Cl. X.R.

340—172.5